United States Patent [19]
Delsanto

[11] Patent Number: 5,038,915
[45] Date of Patent: Aug. 13, 1991

[54] ARTICLE SYNCHRONIZING APPARATUS FOR WRAPPING OR BOXING MACHINES

[75] Inventor: Mario Delsanto, Feletto Canavese, Italy

[73] Assignee: Hitech Systems s.r.l., Mathi, Italy

[21] Appl. No.: 484,331

[22] Filed: Feb. 22, 1990

[30] Foreign Application Priority Data

Mar. 2, 1989 [IT] Italy .................... 67142 A/89

[51] Int. Cl.$^5$ .................................. B65G 47/26
[52] U.S. Cl. ........................ 198/419.3; 198/460
[58] Field of Search ............ 198/419.2, 419.3, 460

[56] References Cited

U.S. PATENT DOCUMENTS

| | | | |
|---|---|---|---|
| 3,075,630 | 1/1963 | Fisk | 198/460 |
| 4,054,823 | 10/1977 | Watkin | 198/419.2 |
| 4,360,098 | 11/1982 | Nordstrom | 198/419.2 |
| 4,514,963 | 5/1985 | Bruno | 198/460 |
| 4,604,704 | 8/1986 | Eaves et al. | 198/460 |
| 4,640,408 | 2/1987 | Eaves | 198/460 |
| 4,653,630 | 3/1987 | Bravin | 198/460 |

FOREIGN PATENT DOCUMENTS 2182299 5/1987 United Kingdom ............ 198/460

Primary Examiner—Joseph E. Valenza
Attorney, Agent, or Firm—Browdy and Neimark

[57] ABSTRACT

The apparatus evens up articles arriving on a flow smoothing belt (12) and leaving on a downstream belt (26) for feeding a wrapping machine, and provided with equidistant ledges (28) separating groups of articles, and with at least one corrector belt (16, 18), driven by a variable-speed motor (20, 22) for transferral of the articles to the downstream belt. The apparatus comprises: a detector (30) of the ledges in said downstream belt, adapted to supply a signal at the instant when each ledge passes a predetermined position; a first tachometer (40) adapted to supply a signal proportional to the speed of said downstream belt; an article-position detector (60, 62) for each corrector belt, adapted to deliver a signal at the instant when each article enters said corrector belt; and a microprocessor (80, 82) for each corrector belt, connected for receiving the signals generated by said ledge detector, from said first tachometer and from said article-position detector for the associated corrector belt, and connected for delivering a speed-control signal to the motor of said corrector belt, and programmed for controlling the speed of the associated corrector belt to a base value which is proportional to the speed of the downstream belt by a predetermined constant, and for instantaneously changing said base value of the speed by an additive corrective constant which is proportional to the product of said base speed and the position error of the article entering the corrector belt.

19 Claims, 3 Drawing Sheets

ARTICLE SYNCHRONIZING APPARATUS FOR WRAPPING OR BOXING MACHINES

BACKGROUND OF THE INVENTION

This invention relates to an article grouping and synchronizing apparatus for wrapping or boxing machines, and more particularly it relates to the problem of receiving articles that are delivered irregularly on a delivery conveyor belt and transferring them synchronously to a wrapping or boxing machine.

It is known to solve the above problem by means of one or more position corrector belts placed between the supply conveyor belt and the conveyor belt that feeds the machine, with motor means that are controlled to accelerate or slow down the corrector belt as required, so that a uniform and synchronous flow of articles is obtained at the output.

Such prior systems are tailored to the requirements of the wrapping machine that must be served, such as its throughput, number of grouped articles, etc., as well as to the articles being handled, such as length of each article, etc. Any change of such parameters requires that the adjustment or configuration of the system be changed as well.

The main object of the invention is therefore to provide an article synchronizing apparatus for wrapping or boxing machines, having a high degree of operating flexibility with respect to prior systems of this type, and which more particularly is capable of working with a wide range of article sizes and of operative throughput of the downstream machine, and with variable groups of articles, with automatic adjustment to changes in the parameters.

SUMMARY OF THE INVENTION

The above and other objects and advantages, such as will appear from the following disclosure, are achieved by the invention by providing an apparatus for grouping and synchronizing articles arriving on a flow smoothing conveyor belt and leaving on a downstream conveyor belt for feeding a wrapping or boxing machine, and provided with equidistant ledges separating groups of articles, and with at least one corrector belt for transferral of the articles from the flow smoothing belt to the downstream belt, the corrector belt being driven by a variable-speed motor, characterized in that the apparatus comprises:

a) a detector of the ledges in said downstream belt, adapted to supply a signal at the instant when each ledge passes a predetermined position;

b) a first tachometer adapted to supply a signal proportional to the speed of said downstream belt;

c) an article position detector for each corrector belt, adapted to deliver a signal at the instant when each article enters said corrector belt;

d) a microprocessor for each corrector belt, connected for receiving the signals generated by said ledge detector, form said first tachometer and from said article-position detector for the associated corrector belt, and connected for delivering a speed-control signal to the motor of said corrector belt, and programmed for controlling the speed of the associated corrector belt to a base value which is proportional to the speed of the downstream belt by a predetermined constant, and for instantaneously changing said base value of the speed by an additive corrective constant which is proportional to the product of said base speed and the position error of the article entering the corrector belt.

BRIEF DESCRIPTION OF THE DRAWINGS

The invention will now be disclosed in more detail with reference to a preferred embodiment, shown in the attached drawings, and given by way of illustrative and nonlimiting example, and wherein.

DESCRIPTION OF PREFERRED EMBODIMENTS

Figure 1:
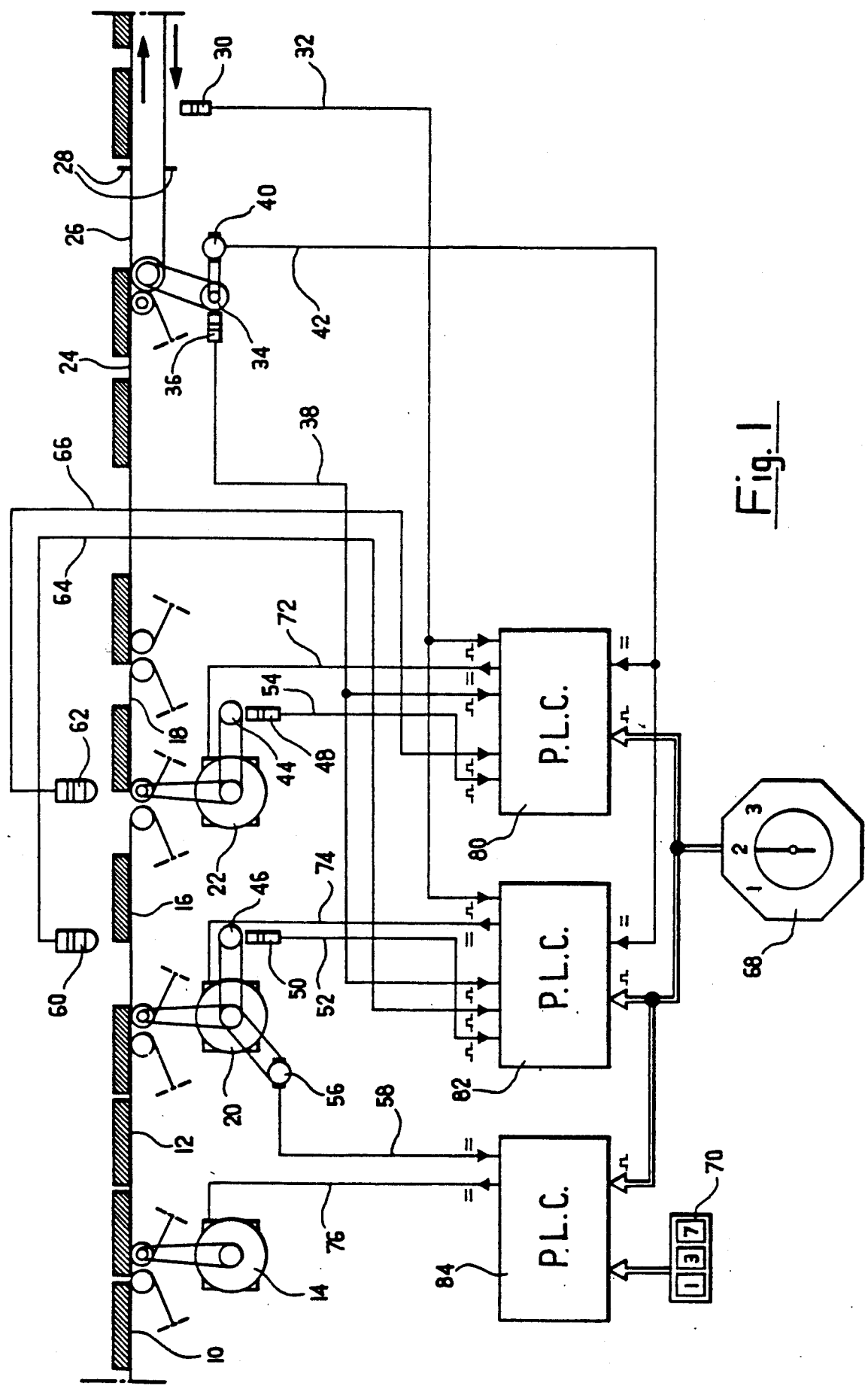
FIG. 1 is a schematic representation of an article grouping and synchronizing system, comprising a first embodiment of an apparatus according to the invention.

FIG. 1 schematically shows a system for feeding articles to a wrapping machine (not shown). A supply belt 10, driven by a motor not shown, carries articles with a speed which is arbitrary, or outside control of the system. At the end of supply belt 10 a flow smoothing belt 12 is placed, driven by an electric motor 14, and at the end of the latter two corrector belts 16 and 18 are arranged, driven by respective electric motors 20, 22, to which an intermediate belt 24 follows, which is mechanically connected with a delivery belt 26 of the wrapping machine. The latter is driven by a motor not shown, which is part of the wrapping machine itself.

Belt 26 has ledges 28, arranged at equal intervals along the belt, adjustable in number and distance form one another, depending on the length of the articles being fed to the wrapping machine and on the number of articles forming each group. A sensor 30, such as a photoelectric cell or a proximity switch, is placed near belt 26 so that it detects consecutive ledges 28 during motion of the belt, and to deliver an electric pulse at the passage of each ledge. A tone wheel 34 takes its motion from belt 26 so as to turn synchronously with it. The passage of the teeth of tone wheel 34 are detected by a sensor 36 similar to sensor 30, for delivering corresponding pulses on a line 38. Tone wheel 34 also drives a tachometer 40, which delivers a signal having an amplitude proportional to the belt speed on a line 42.

Two tone wheels 44, 46 are respectively mounted on each of motors 22, 20, and their teeth are sensed by respective associated sensors 48, 50, which deliver pulsed signals on respective lines 52, 54. A second tachometer 56 is associated to motor 20, which delivers a signal of amplitude proportional to its speed on a line 58.

Finally, above belts 16, 18 two optical detectors 60, 62 are mounted, for detecting the passage of each article transiting on the underlying belt, and delivering corresponding pulsed signals on respective lines 64, 66.

The control system comprises three PLC (programmable logic controller) controllers 80, 82, 84, (e.g., PS3 manufactured by the German firm Klockner & Moeller. Each of PLCs 80, 82, 84 comprises an internal CPU, or central processing unit, adapted to communicate with the outside world via several interfaces of serial, parallel and analogic type, as will be further explained below.

Each of PLCs 80, 82, 84 receives, through a respective parallel interface, a digital signal representing the number of articles in each group, in the range 1 to 3, as set by a selector 68. Further, PLC 84 receives on a parallel input a value set by a thumbwheel switch 70, which can be set by the user and which represents the length of the articles to be synchronized.

PLC 80 receives pulsed signals from sensor 30 on line 32, from sensor 36 on line 38 and from sensor 48 on line 54, as well as from detector 62 on line 66. It further receives a continuous analogic signal from tachometer 40 on line 42. PLC 80 further receives said signal giving the number of articles in each group, and finally it generates an analogic signal for controlling motor 22 on an output line 72.

PLC 82 also receives pulse signals from sensor 30 on line 32 and from sensor 36 on line 38. It also receives pulsed signals from sensor 50 on line 52, as well as from detector 60 on line 64. PLC 82 also receives the continuous analogic signal from tachometer 40 on line 42. Finally, PLC 82 receives the same signal giving the number of articles in each group already mentioned above, and it generates an analog signal for controlling motor 20 on an output line 74.

Finally, also PLC 84 receives the same signal giving the number of articles in each group already mentioned above, as well as the digital signal of length of each article from rotary switch 70. PLC 84 further receives the continuous analogic signal from tachometer 56 on line 58, and it generates an analogic signal for controlling the speed of motor 14 on an output line 76.

In the operation of the apparatus described above, the articles should arrive in single file on the supply belt, with a flow that will generally be asynchronous, but which should never fall below the average consumption of the downstream machine.

At start, the two belts 10 and 26 begin running at the respective speeds set by the respective motor means, which are beyond the scope of the invention. The length of each article will have previously been set in thumbwheel switch 70, and the number of articles per group in selector 68. The ledges 28 will have been arranged at desired distances on belt 26, so that they can accommodate the desired nuber of articles of chosen length between one another.

The three PLCs are programmed to perform the following functions.

Firstly, at start, an initialization procedure concerning the distance between the ledges is performed (automatically or by manual command). To this purpose, PLC 80 checks whether the tachometric signal on line 42 is different from zero, in order to determine whether the downstream wrapping machine is running, and waits until such condition prevails. PLC 80 then waits for the appearance of an impulse on ledge-detection line 32. When received, such impulse clears an internal counter for self-learning of the distance between the ledges (not shown), and causes such counter to start a clocked incrementation, until an impulse appears again on line 32. The count attained is a measure of the distance between two consecutive ledges. However, such distance is divided by the number of articles per group, as selected on selector 68. This amounts to image the existence of virtual ledges, such that the groups of articles are subdivided in single articles. From the "distance between virtual ledges" thus obtained (which in the following disclosure will be shortly called "distance between ledges") two further values are obtained, $\frac{1}{3}$ and $\frac{2}{3}$ respectively of said distance, and whose purpose will be described below.

In the next step, PLCs 80 and 82 begin to compute continuously, at each step of the PLC, the base speed of the respective corrector belt 18 and 16. To this purpose, the speed of the downstream machine, as given by the tachometric signal on line 42, is multiplied by the ratio between the length of the corrector belt (as stored in the PLC's internal memory) and the distance between (virtual) ledges. The result is the base speed, and is sent as speed-control signal to the motor driving the corrector belt. Such operation is continuously repeated at the rate of the PLC's clock, e.g. at each millisecond. The speed of the corrector belt, thus determined, allows only one article to pass on the belt at a time.

In parallel to computing the base speed, PLC 82 detects from sensor 60 the passage of the rear edge of each article entering the corrector belt, and starts a counter counting the pulses generated by tone wheel 34 and delivered to PLC 82 on line 38. In order to discriminate the rear edge of each article, the PLC is programmed to only detect the falling edge of the signal coming from detector 60, the rising edge being ignored. Such counter is reset each time that an impulse appears on line 32, signalling the passage of an ledge 28, and whenever the count reaches the value of distance between (virtual) ledges mentioned above.

At the instant when detector 60 detects the rear end of an article, the count attained by the position counter, representing the position error of the article on the corrector belt from the desired position, is compared with the three values: distance between ledges, and $\frac{1}{3}$ and $\frac{2}{3}$ of said distance. If the count in the continuous counter is larger than $\frac{2}{3}$ of the distance, then the article is late with respect to the optimal position, and therefore should be accelerated; if smaller, then the article is early and therefore should be slowed down. In order to determine the amount of speed correction required for the corrector belt, PLC 82 is programmed to divide the value of the base speed by $\frac{1}{3}$ of the distance between ledges in case of acceleration, and by $\frac{2}{3}$ of said distance in case of deceleration. The result is multiplied by an error obtained as difference between the count of the position counter and said value of $\frac{2}{3}$ of the distance between ledges, in case of deceleration, or $\frac{1}{3}$ of said distance, in case of acceleration. The corrective amount thus obtained is added to or respectively subtracted from the base speed of the corrector belt (which is constantly updated) for a fixed time, equal to the time required for covering $\frac{1}{3}$ of the length of the belt. The latter time is determined from the reading of the number of teeth of tone wheel 46, as supplied by sensor 50 on line 74.

PLC 80, with its associated sensor 62, performs the same procedures as PLC 82, independently from the latter, with reference to corrector belt 18. Since the articles entering corrector belt 18 have already been by corrector belt 16, this second stage performs a correction of second approximation. In order to better distribute the workload which each corrector belt has to perform, the amount of correction is divided in each PLC 80, 82 by the number of corrector belts, i.e. in this example is halved.

In order to avoid incessant speed fluctuations of the corrector belts, such as would occur in case of a permanent disagreement between the speed of the first corrector belt 16 and the speed of the flow smoothing belt 12, the invention provides that the latter has a speed adjusted to the speed of the downstream belt. To this purpose, PLC 84 controls motor 14 so that it runs at a speed equal to the signal given by tachometer 56 (except for a design constant) multiplied by the number of articles set in selector 68, further multiplied by the length of an article as set in thumbwheel switch 70. Due to this provision, the articles arriving in turn undergo a global preliminary correction, so that they will not require further corrections on average, and the operation of the corrector belt has only the purpose of compensating individual positioning irregularities of the articles.

In stallations not requiring the capability of setting the length of the articles, and not requiring their grouping, the flow smoothing belt might be driven directly by mechanical connection to the downstream belt 16, and in this case PLC 84 would obviously be dispensed with.

Further, although the provision of a twofold corrector belt is advisable in high-performance systems, in systems with lower performance the apparatus could obviously be provided with only one corrector belt, while, in case of higher operating speeds and/or of more stringent operating requirements, the system could comprise a third corrector belt with associated PLC, position sensor, etc.

It is also possible to provide an apparatus according to the teachings given above by using fast microprocessors rather than PLCs as disclosed above. An embodiment of this type is shown on FIG. 2, and is identical to the embodiment of FIG. 1 as far as the conveyor belts, motors, sensors and detectors are concerned, as well as the length switch ++ and the selector for the number of articles per group. Therefore, these items bear the same reference numbers as on FIG. 1, and will not be described.

Figure 2:
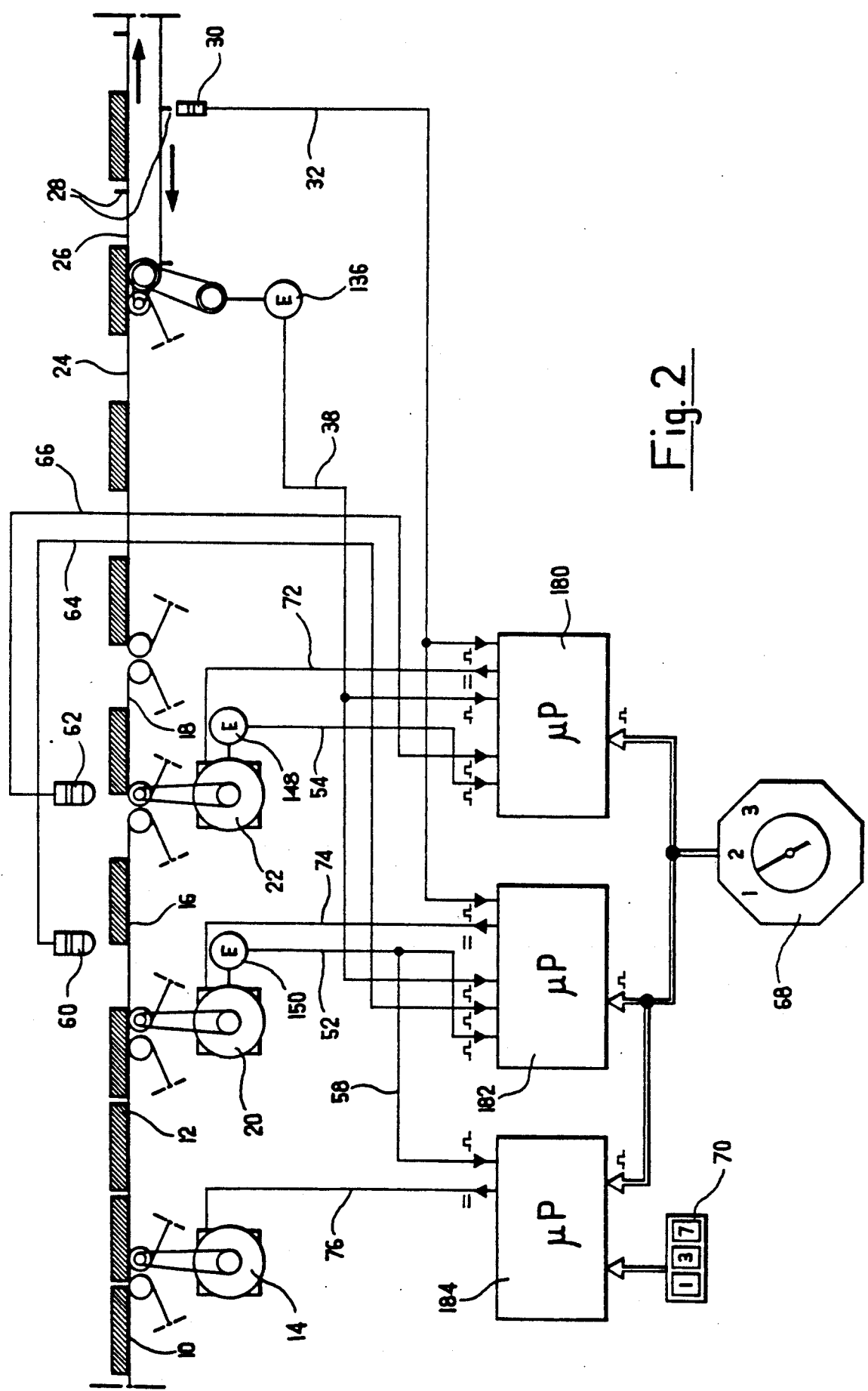
FIG. 2 is a schematic representation similar to FIG. 1, for a second preferred embodiment of the apparatus according to the invention.

Instead of tone wheels with associated sensors, in the embodiment of FIG. 2 encoders 136, 148 and 150 have been used, which are associated with the driving of belts 26, 18, 16, respectively. The incremental position signals generated by the encoders are applied to respective microprocessors 180, 182, 184, which also receive all the other signals used in the apparatus of FIG. 1, with the exception of the tachometric signals. In contrast to FIG. 1, there are here no tachometers or other equivalent meters, as their functions have been replaced by a computation of speed performed by the respective microprocessors under control of their internal clock, based on the signals from the encoders.

The functions performed by microprocessors 180, 182, 184 are identical to those described for PLCs 80, 82, 84 of FIG. 1, and their programming is similar. For the sake of simplicity, a detailed description is therefore omitted.

Figure 3:
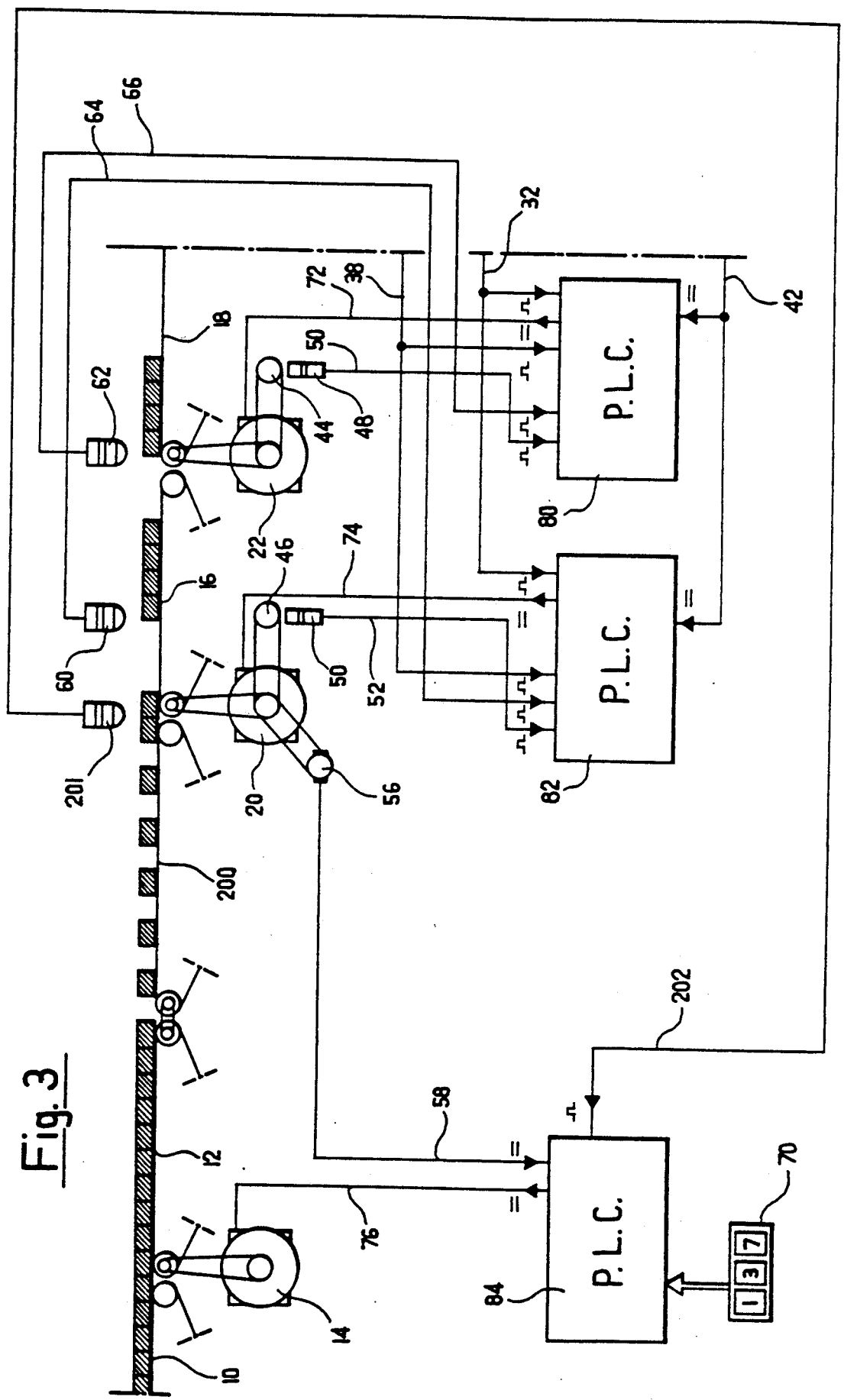
FIG. 3 is a partial schematic illustration for a third embodiment of the invention.

A third embodiment of the invention is partly shown on FIG. 3, where parts identical to FIG. 1 are indicated with the same reference numbers. The apparatus should be understood to extend to the right identically to the apparatus of FIG. 1.

The apparatus of FIG. 3 is distinguished from the one on FIG. 1 for a group forming belt 200 inserted between flow smoothing belt 12 and the first corrector belt 16. Belt 200 is driven from belt 12 with a fixed mechanical ratio, such that belt 200 runs at a higher speed, e.g. double, the speed of belt 12, so that the articles become spaced out during transit on belt 200, while they are crowded together again when entering corrector belt 16, which runs at the same average speed as belt 12.

At the exit from belt 200, a detector 201 detects the tail edge of each of the articles, and sends a signal over line 202 to PLC 84. The latter can therefore count the articles being transferred to corrector belt 16, and whenever it counts the last article in a group it abruptly lowers the running speed of belts 12 and 200. This gives rise to a pause in the transfer of articles from belt 200 to corrector belt 16, an empty space being formed behind the group of articles that has been transferred. Soon afterwards, PLC 84 raises the speed of flow smoothing belt 12 again to its normal value, and the transfer of a fresh group of articles begins from group forming belt 200 to corrector belt 16. A succession of groups of articles of desired number is thus formed on belt 16 and following, with intervening empty spaces. Detectors 60 and 62 in this case detect the tail of each group of articles, as if it were a single article, and the operation of the downstream apparatus is therefore identical to the one described above for the case of single-article feeding.

The normal speed v of belt 12 is therefore the same as the average speed of corrector belt 16, while its reduced speed $v_R$ is computed by PLC 84 so that the desired empty space is formed between groups of articles, as afunction of the length A of the group forming belt, the length B of each article, and the number n of articles per group. To this purpose, PLC 84 computes $v_R$ by means of the relation:

$$v_R = vB/(A - nB + B),$$

that the person skilled in the art will easily explain on the basis of simple geometrical relations.

The embodiment of FIG. 3 has the advantage of a greater operating flexibility concerning the number of articles per group, particularly in the case of numerous articles (e.g., around 10 articles per group), for which the method of virtual ledges might give rise to grouping errors, as will be apparent fo the person skilled in the art.

In all embodiments described, the programming of the PLCs or microprocessors in order to implement the procedures defined in the disclosure given above are obvious for the person skilled in the art, once the required functions are known, and a description of such programming is therefore omitted.

The term microprocessor will be used in the claims to indicate both the microprocessors of FIG. 2 and the PLCs of FIG. 1, in consideration of their operating similarity.

Preferred embodiments of the invention have been described, but it should be understood that, on the basis of the teachings provided, the person skilled in the art will easily devise changes or modifications, which are functionally equivalent and therefore fall within the inventive concept, such as is defined in the attached claims.

What is claimed is:

1. An apparatus for grouping and synchronizing articles arriving on a flow smoothing conveyor belt and leaving on a downstream conveyor belt for feeding a wrapping or boxing machine, and provided with equidistant ledges separating groups of articles, and with at least one corrector belt for transferral of the articles from the flow smoothing belt to the downstream belt, the corrector belt being driven by a variable-speed motor, said apparatus further comprising:
   (a) a ledge detector means for detecting the ledges in said downstream belt and for supplying a signal at the instant when each ledge passes a predetermined position;

(b) a first tachometer adapted to supply a signal proportional to the speed of said downstream belt;

(c) an article-position detector for each corrector belt, adapted to deliver a signal at the instant when each article enters said corrector belt;

(d) a microprocessor means for each corrector belt for measuring the positional increment between two successive signals received from said ledge detector in order to obtain a distance between ledges, for controlling the speed of the associated corrector belt to a base value which is proportional to the speed of the downstream belt by a predetermined constant, and for instantaneously changing said base value of the speed by an additive corrective constant which is proportional to the product of said base speed and the position error of the article entering the corrector belt, said microprocessor means being connected for receiving the signals generated by said ledge detector, by said first tachometer and by said article-position detector for the associated corrector belt, and connected for delivering a speed-control signal to the motor of said corrector belt.

2. The apparatus of claim 1, characterized in that an incremental position detector (46, 48; 50, 52) is associated to each corrector belt and is connected to provide incremental belt position signals to the associated microprocessor, and in that the associated microprocessor is programmed to change said base speed by said corrective addendum for the time intervening between two successive positions of said corrector belt, which are separated by a predetermined increment.

3. The apparatus of claim 1, characterized in that it further comprises a selector (68) of the number of articles per group to be accommodated between two successive ledges, and in that each microprocessor is programmed to divide said distance between ledges by said number of articles per group, in order to obtain a distance between virtual articles.

4. The apparatus of claim 1, characterized in that said flow smoothing belt is driven by a controllable-speed motor (14), and in that an auxiliary microprocessor (84) controls said speed proportionally to a tachometric signal coming from a second tachometer (56) of said corrector belt.

5. The apparatus of claim 4, characterized in that it further comprises a user-settable coded switch (70), providing said auxiliary microprocessor with an article-length signal, and in that said auxiliary microprocessor is programmed to change the speed control of said flow smoothing belt proportionally to said article-length signal.

6. The apparatus of claim 4, characterized in that it further comprises a group-forming belt (200) immediately downstream of the flow smoothing belt and driven thereby with a fixed speed ratio greater than 1, an article detector (201) associated with the group forming belt and adapted to supply to the auxiliary microprocessor article detection signals for each article leaving the group forming belt, and a user-settable coded switch (70) providing said auxiliary microprocessor with an article-length signal; and in that said auxiliary microprocessor is programmed to count the article-detection signals received from said article detector associated with the group forming belt and to momentarily lower the speed of said flow smoothing belt whenever it has completed the count of a number of articles equal to the number of articles per group.

7. The apparatus of claim 6, characterized in that the reduced speed of said flow smoothing belt is computed by the auxiliary microprocessor by means of the relation:

$$v_R = vB/(A - nB + B),$$

where $v_R$ is the reduced speed, v the normal speed, A length of the group forming belt, B the length of each article, and n the number of articles per group.

8. The apparatus of claim 1, characterized in that said tachometric meters are tachometric dynamos.

9. The apparatus of claim 1, characterized in that said tachometric meters are encoders (136, 148, 150).

10. The apparatus of claim 1, characterized in that said microprocessors are PLCs.

11. The apparatus of claim 1, characterized in that it comprises two of said corrector belts (16, 18) in sequence.

12. An apparatus for grouping and synchronizing articles arriving on a flow smoothing conveyor belt and leaving on a downstream conveyor belt for feeding a wrapping or boxing machine, and provided with equidistant ledges separating groups of articles, and with at least one corrector belt for transferral of the articles from the flow smoothing belt to the downstream belt, the corrector belt being driven by a variable-speed motor, characterized in that the apparatus comprises:

(a) a detector of the ledges in said downstream belt, adapted to supply a signal at the instant when each ledge passes a predetermined position;

(b) a first tachometer adapted to supply a signal proportional to the speed of said downstream belt;

(c) an article-position detector for each corrector belt, adapted to deliver a signal at the instant when each article enters said corrector belt;

(d) a microprocessor for each corrector belt, connected for receiving the signals generated by said ledge detector, from said first tachometer and from said article-position detector for the associated corrector belt, and connected for delivering a speed-control signal to the motor of said corrector belt, and programmed for controlling the speed of the associated corrector belt to a base value which is proportional to the speed of the downstream belt by a predetermined constant, and for instantaneously changing said base value of the speed by an additive corrective constant which is proportional to the product of said base speed and the position error of the article entering the corrector belt;

(e) said flow smoothing belt being driven by a controllable-speed motor, and further comprising an auxiliary microprocessor controlling said speed proportionally to a tachometric signal coming from a second tachometer of said corrector belt.

13. The apparatus of claim 12, characterized in that it further comprises a user-settable coded switch (70), providing said auxiliary microprocessor with an article-length signal, and in that said auxiliary microprocessor is programmed to change the speed control of said flow smoothing belt proportionally to said article-length signal.

14. The apparatus of claim 12, characterized in that it further comprises a group-forming belt (200) immediately downstream of the flow smoothing belt and driven thereby with a fixed speed ratio greater than 1, an article detector (201) associated with the group forming belt and adapted to supply to the auxiliary microprocessor article detection signals for each article leaving the group forming belt, and a user-settable coded switch (70) providing said auxiliary microprocessor with an article-length signal; and in that said auxiliary microprocessor is programmed to count the article-detection signals received from said article detector associated with the group forming belt and to momentarily lower the speed of said flow smoothing belt whenever it has completed the count of a number of articles equal to the number of articles per group.

15. The apparatus of claim 14, characterized in that the reduced speed of said flow smoothing belt is computed by the auxiliary microprocessor by means of the relation:

$$v_R = vB/(A - nB + B),$$

where $v_R$ is the reduced speed, v the normal speed, A length of the group forming belt, B the length of each article, and n the number of articles per group.

16. The apparatus of claim 12, characterized in that said tachometric meters are tachometric dynamos.

17. The apparatus of claim 12, characterized in that said tachometric meters are encoders.

18. The apparatus of claim 12, characterized in that said microprocessors are PLCs.

19. An apparatus for grouping and synchronizing articles arriving on a flow smoothing conveyor belt and leaving on a downstream conveyor belt for feeding a wrapping or boxing machine, and provided with equidistant ledges separating groups of articles, and with at two corrector belts in sequence for transferral of the articles from the flow smoothing belt to the downstream belt, the corrector belts being driven by a variable-speed motor, characterized in that the apparatus comprises:
  (a) a detector of the ledges in said downstream belt, adapted to supply a signal at the instant when each ledge passes a predetermined position;
  (b) a first tachometer adapted to supply a signal proportional to the speed of said downstream belt;
  (c) an article-position detector for each corrector belt, adapted to deliver a signal at the instant when each article enters said corrector belt;
  (d) a microprocessor for each corrector belt, connected for receiving the signals generated by said ledge detector, from said first tachometer and from said article-position detector for the associated corrector belt, and connected for delivering a speed-signal to the motor of said corrector belt, and programmed for controlling the speed of the associated corrector belt to a base value which is proportional to the speed of the downstream belt by a predetermined constant, and for instantaneously changing said base value of the speed by an additive corrective constant which is proportional to the product of said base speed and the position error of the article entering the corrector belt.

* * * * *